US008822563B2

(12) United States Patent
Mochizuki et al.

(10) Patent No.: US 8,822,563 B2
(45) Date of Patent: Sep. 2, 2014

(54) CURABLE RESIN COMPOSITION AND MOLDED ARTICLE

(71) Applicant: FUJIFILM Corporation, Tokyo (JP)

(72) Inventors: Hiroaki Mochizuki, Ashigarakami-gun (JP); Naoyuki Morooka, Ashigarakami-gun (JP); Rie Okutsu, Ashigarakami-gun (JP); Tatsuhiko Obayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/744,507

(22) Filed: Jan. 18, 2013

(65) Prior Publication Data

US 2013/0131212 A1   May 23, 2013

Related U.S. Application Data

(63) Continuation of application No. PCT/JP2011/065427, filed on Jul. 6, 2011.

(30) Foreign Application Priority Data

Jul. 29, 2010  (JP) .................................. 2010-170813
Jun. 1, 2011   (JP) .................................. 2011-123260

(51) Int. Cl.
   *C08F 12/08* (2006.01)
   *C08F 12/00* (2006.01)
   *C08J 3/28* (2006.01)

(52) U.S. Cl.
   USPC ........... 522/188; 522/135; 522/142; 522/144; 522/150; 522/153; 522/157; 522/160; 522/178; 522/182; 522/184; 522/134; 522/173; 522/174; 522/181; 522/186; 427/508; 427/510; 430/281.1; 430/269; 385/129; 385/131

(58) Field of Classification Search
   USPC ............... 522/178, 180, 46, 48, 79, 174, 173, 522/181, 186, 184, 135, 142, 144, 150, 153, 522/157, 160, 182, 188, 134; 427/510, 508; 430/281.1, 269; 385/129, 131
   See application file for complete search history.

(56) References Cited

U.S. PATENT DOCUMENTS 8,404,797 B2 *    3/2013   Kawabe et al. ............... 528/205
2011/0105638 A1 * 5/2011   Kawabe et al. ............... 522/182

FOREIGN PATENT DOCUMENTS

| EP | 2 275 459 A1 | 1/2011 |
|---|---|---|
| JP | 03-296513 A | 12/1991 |
| JP | 2003-012738 A | 1/2003 |
| JP | 2004-263135 A | 9/2004 |
| JP | 2006-213851 A | 8/2006 |
| JP | 2009-102500 A | 5/2009 |
| JP | 2010-138370 A | 6/2010 |
| WO | 2009/110453 A1 | 9/2009 |

OTHER PUBLICATIONS

International Search Report dated Aug. 23, 2011 for PCT/JP2011/065427.
Written Opinion of the International Searching Authority (with English translation) in PCT/JP2011/065427 mailed Feb. 14, 2013.
International Preliminary Report on Patentability (with English translation) in PCT/JP2011/065427 mailed Feb. 7, 2013.
Office Action dated Jan. 30, 2014 in Chinese Application No. 201180036369.2.
Office Action dated Jun. 19, 2014 issued from the State Intellectual Property Office of P.R. China in Chinese Application No. 201180036369.2.

* cited by examiner

*Primary Examiner* — Sanza McClendon
(74) *Attorney, Agent, or Firm* — Sughrue Mion, PLLC

(57) ABSTRACT

Disclosed is a curable resin composition comprising a polymer (A) that has a main chain comprising carbon atoms and a side chain having a polymerizing unsaturated linking group and has a cyclic structure in the main chain and/or the side chain, and a compound having a polymerizing unsaturated group. The curable resin composition has good optical characteristics, good heat resistance and good moldability.

23 Claims, No Drawings

CURABLE RESIN COMPOSITION AND MOLDED ARTICLE

CROSS-REFERENCE TO RELATED APPLICATIONS

This application is a continuation application of International Application No. PCT/JP2011/065427, filed Jul. 6, 2011, which in turn claims the benefit of priority from Japanese Application No. 2010-170813, filed Jul. 29, 2010, and Japanese Application No. 2011-123260, filed Jun. 1, 2011, the disclosures of which applications are incorporated by reference herein in their entirety.

BACKGROUND OF THE INVENTION

1. Field of the Invention

The present invention relates to a curable resin composition and to a molded article produced by molding the curable resin composition. Further, the invention relates to a method for producing the molded article. In particular, the invention relates to a curable resin composition useful for production of optical parts.

2. Description of the Related Art

Heretofore, a curable resin composition has been employed for producing optical parts such as lenses, etc. The curable resin composition to be used here is injected into a mold or the like, cured and molded therein. A curable resin composition, of which cure shrinkage is reduced by incorporating thereinto a polymer having a polymerizing group and referred to as a prepolymer, is known.

As the curable resin composition of the type, known are those described in Patent Document 1 and Patent Document 2. The curable resin composition described in Patent Document 1 uses an urethane resin as the resin ingredient therein. The curable resin composition described in Patent Document 1 shrinks little in curing, has good mold releasability and is excellent in scratch resistance, and is further excellent in long-term stability at 60° C. However, the composition has a problem in that its water absorption is high.

On the other hand, Patent Document 2 describes a curable resin composition containing an adamantyl acrylate. The curable resin composition described in Patent Document 2 has high transparency. However, it has a problem in that the glass transition temperature (Tg) thereof is low.

CITATION LIST

Patent Document

Patent Document 1: JP-A 3-296513
Patent Document 2: JP-A 2006-213851

SUMMARY OF THE INVENTION

An object of the present invention is to provide a curable resin composition that can be used for producing optical parts, etc., and has optical characteristics, heat resistance and good moldability.

Given the situation, the present inventors have assiduously studied and, as a result, have found that when a curable resin composition comprising a polymer (A) having a main chain comprising carbon atoms and a side chain having a polymerizing unsaturated linking group and having a cyclic structure in the main chain or the side chain, and a compound having a polymerizing unsaturated group is employed, then the above-mentioned problems can be solved, and have completed the present invention. Concretely, the invention has been attained by the following means.

(1) A curable resin composition comprising a polymer (A) that has a main chain comprising carbon atoms and a side chain having a polymerizing unsaturated linking group and has a cyclic structure in the main chain and/or the side chain, and a compound having a polymerizing unsaturated group.

(2) The curable resin composition according to (1), which contains, as the compound having a polymerizing unsaturated group, a compound (B) having at least two polymerizing unsaturated groups.

(3) The curable resin composition according to (2), wherein the polymerizing unsaturated groups that the compound (B) having at least two polymerizing unsaturated groups each are selected from an acryloyl group, a methacryloyl group, a vinyl group and an allyl group.

(4) The curable resin composition according to (2) or (3), wherein the compound (B) having at least two polymerizing unsaturated groups has an alicyclic structure.

(5) The curable resin composition according to any one of (1) to (4), which contains, as the compound having a polymerizing unsaturated group, a compound (C) having one polymerizing unsaturated group.

(6) The curable resin composition according to (5), wherein the compound (C) having one polymerizing unsaturated group has a cyclic structure.

(7) The curable resin composition according to any one of (1) to (6), wherein the polymer (A) has at least one type of recurring unit of the recurring unit represented by the following general formula (1) and the recurring unit represented by the following general formula (2):

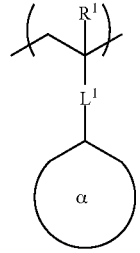

General Formula (1)

wherein, in the general formula (1), $R^1$ represents a hydrogen atom or a substituent; $L^1$ represents a divalent linking group or a single bond; and the ring α represents a monocyclic or multicyclic ring,

General Formula (2)

wherein, in the general formula (2), the ring β represents a monocyclic or polycyclic ring.

(8) The curable resin composition according to (7), wherein the recurring unit is selected from the recurring unit represented by the general formula (1) where α contains acyclic structure having a skeleton with from 5 to 15 carbon atoms and the recurring unit represented by the general formula (2) where β contains a cyclic structure having a skeleton with from 5 to 10 carbon atoms.

(9) The curable resin composition according to (7), wherein the recurring unit is selected from the recurring unit represented by the general formula (1) where α contains acyclic structure having a skeleton with a structure selected from the following group (1), and the recurring unit represented by the general formula (2) where β contains a cyclic structure having a skeleton with a structure selected from the following group (2):

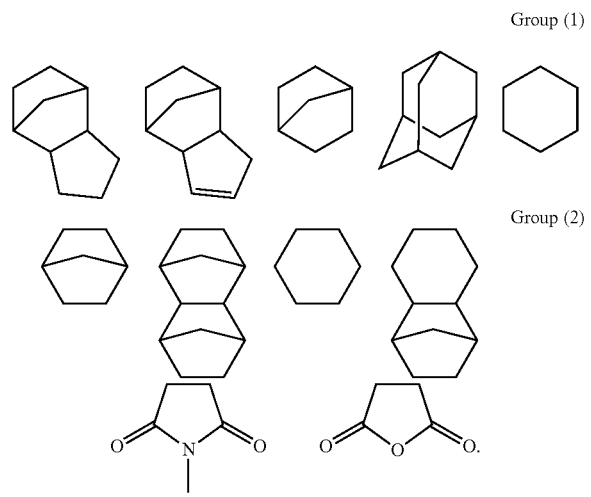

Group (1)

Group (2)

(10) The curable resin composition according to any one of (7) to (9), wherein, in the recurring unit represented by the general formula (1), $L^1$ is selected from a group of —CO—, —O—, —CH$_2$— and a combination of these.
(11) The curable resin composition according to any one of (1) to (10), wherein the polymer (A) further contains a recurring unit represented by the following general formula (3):

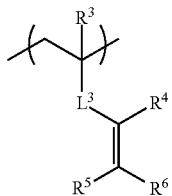

General Formula (3)

wherein, in the general formula (3), $R^3$ to $R^6$ each independently represent a hydrogen atom or a substituent; and $L^3$ represents a divalent lining group or a single bond.
(12) The curable resin composition according to any one of (7) to (11), wherein the polymer (A) is a polymerizable composition containing a polymerizing compound, and the polymerizing compound ingredient is produced by the use of a polymerizable composition composed of only from 5 to 100% by mass of a polymerizing compound to constitute the recurring unit represented by the general formula (1) and/or the recurring unit represented by the general formula (2), from 0 to 95% by mass of a polymerizing compound to constitute the recurring unit represented by the general formula (3), and at most 5% by mass of any other polymerizing compound.
(13) The curable resin composition according to any one of (1) to (12), wherein the weight-average molecular weight of the polymer (A) is from 500 to less than 1,000,000.
(14) The curable resin composition according to any one of (5) to (13), wherein the content of the polymer (A) is from 5 to 60% by mass, the content of the compound (B) having at least two polymerizing unsaturated groups is from 20 to 90% by mass, the content of the compound (C) having one polymerizing unsaturated group is from 0 to 40% by mass, and the content of the other ingredient is at most 5% by mass.
(15) The curable resin composition according to any one of (1) to (14), which contains at least two types of initiators (D) that initiate curing through irradiation with light or heat.
(16) The curable resin composition according to any one of (1) to (15), of which, after cured, the refractive index at a wavelength of 589 nm is at least 1.45, the Abbe's number is at least 45 and the light transmittance at a wavelength of 589 nm through a thickness thereof of 1 mm is at least 75%.
(17) The curable resin composition according to any one of (1) to (16), of which, after cured, the glass transition temperature is not lower than 230° C.
(18) A molded article produced by molding the curable resin composition of any one of (1) to (17).
(19) An optical part produced by molding the curable resin composition of any one of (1) to (17).
(20) The optical part according to (19), which is a lens substrate.
(21) A method for producing a molded article, which comprises curing the curable resin composition of any one of (1) to (17) in two stages in a mold.

The invention has made it possible to provide a curable resin composition having optical characteristics, heat resistance and high moldability.

MODE FOR CARRYING OUT THE INVENTION

The contents of the invention are described in detail hereinunder. In this description, the numerical range expressed by the wording "a number to another number" means the range that falls between the former number indicating the lower limit of the range and the latter number indicating the upper limit thereof.
[Curable Resin Composition]
The curable resin composition of the invention contains a polymer (A) that has a main chain comprising carbon atoms and a side chain having a polymerizing unsaturated linking group and has a cyclic structure in the main chain and/or the side chain, and a compound having a polymerizing unsaturated group, and preferably contains at least one such polymer (A) and at least one such compound having a polymerizing unsaturated group. In this, the compound having a polymerizing unsaturated group includes a compound (B) having at least two polymerizing unsaturated groups and/or a compound (C) having one polymerizing unsaturated group, and preferably contains a compound (B) having at least two polymerizing unsaturated groups, more preferably both a compound (B) having at least two polymerizing unsaturated groups and a compound (C) having one polymerizing unsaturated group.

The curable resin composition of the invention may be prepared by dissolving the polymer (A) after isolated, in the compound having a polymerizing unsaturated group, or by synthesizing the polymer (A) in the compound having a polymerizing unsaturated group.
[Polymer (A)]
The polymer (A) for use in the invention has a main chain comprising carbon atoms and a side chain having a polymerizing unsaturated linking group and has a cyclic structure in the main chain or the side chain.

In this, the polymer (A) preferably has at least one type of recurring unit of the recurring unit represented by the following general formula (1) and the recurring unit represented by the following general formula (2).

General Formula (1)

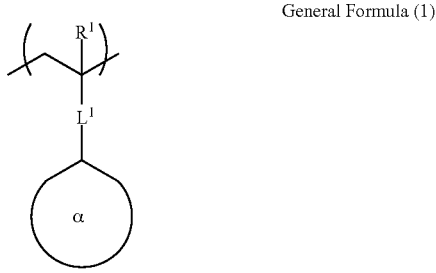

In the general formula (1), $R^1$ represents a hydrogen atom or a substituent; $L^1$ represents a divalent linking group or a single bond; and the ring α represents a monocyclic or multicyclic ring.

In the general formula (1), $R^1$ is preferably a hydrogen atom or an alkyl group, more preferably a hydrogen atom or an alkyl group having from 1 to 4 carbon atoms, even more preferably a hydrogen atom or a methyl group.

In the general formula (1), $L^1$ is preferably a divalent linking group selected from —CO—, —O—, —CH$_2$— and a combination of these, or a single bond, more preferably a divalent linking group selected from —CO—, —O—, —CH$_2$— and a combination of these. Preferably, the side of $L^1$ bonding to the main chain is —C(=O)—O—.

In the general formula (1), α is preferably a cyclic structure having a skeleton with from 5 to 15 carbon atoms, more preferably a cyclic structure having, as the skeleton, a structure selected from the following group (1).

Group (1)

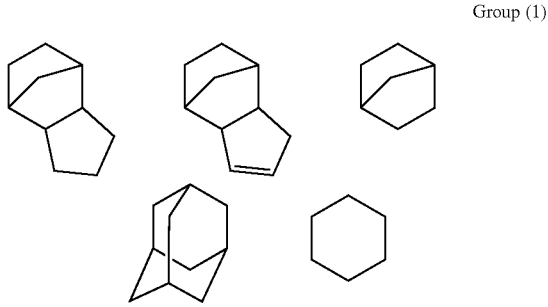

The above cyclic structure may have a substituent, or may not have a substituent. In case where the structure has a substituent, the substituent is preferably an alkyl group, more preferably an alkyl group having from 1 to 3 carbon atoms, even more preferably a methyl group.

The recurring unit represented by the general formula (1) is formed generally through polymerization of a polymerizing compound. The molecular weight of the polymerizing compound of the type is preferably from 100 to 500, more preferably from 100 to 400, even more preferably from 150 to 300.

General Formula (2)

In the general formula (2), the ring β represents a monocyclic or polycyclic ring.

In the general formula (2), β is preferably a cyclic structure having a skeleton with from 5 to 10 carbon atoms, more preferably a cyclic structure having, as the skeleton thereof, a structure selected from the following group (2).

Group (2)

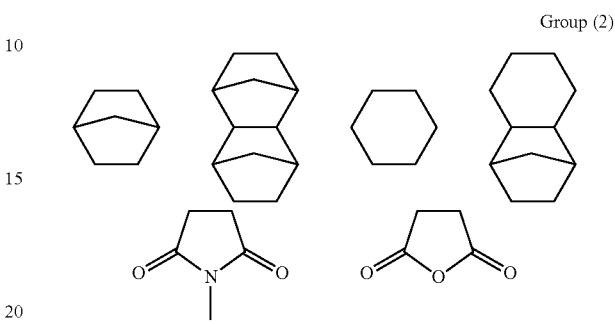

The above cyclic structure may have a substituent, or may not have a substituent. In case where the structure has a substituent, the substituent includes an alkyl group, an allyl group, an oxo group, a hydroxy group, a cyano group and a halogen atom, and these may be further substituted with any of these groups. Preferably, the substituent comprises at least any one or more of a carbon atom, a hydrogen atom, an oxygen atom and a nitrogen atom. Preferably, the total number of the atoms of a carbon atom, an oxygen atom and a nitrogen atom is from 1 to 10, more preferably from 1 to 5.

The recurring unit represented by the general formula (2) is generally formed through polymerization of a polymerizing compound. The molecular weight of the polymerizing compound of the type is preferably from 60 to 300, more preferably from 70 to 250, even more preferably from 80 to 200.

Preferably, the polymer (A) in the invention further contains a recurring unit represented by the following general formula (3).

General Formula (3)

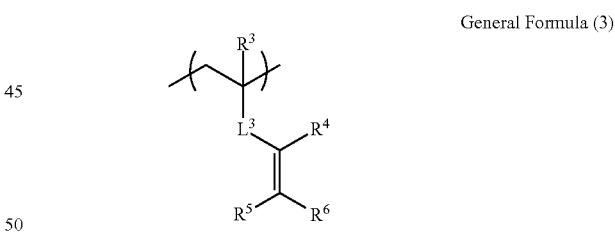

In the general formula (3), $R^3$ to $R^6$ each independently represent a hydrogen atom or a substituent; and $L^3$ represents a divalent lining group or a single bond.

$R^3$ is preferably a hydrogen atom or an alkyl group, more preferably a hydrogen atom or an alkyl group having from 1 to 4 carbon atoms, even more preferably a hydrogen atom or a methyl group.

$R^4$ and $R^5$ each are preferably a hydrogen atom or an alkyl group, more preferably a hydrogen atom or an alkyl group having from 1 to 4 carbon atoms, even more preferably a hydrogen atom or a methyl group, and especially preferably a hydrogen atom.

$R^6$ is preferably a hydrogen atom or an alkyl group, more preferably a hydrogen atom or an alkyl group having from 1 to 4 carbon atoms, even more preferably a hydrogen atom or a methyl group.

$L^3$ is preferably a divalent linking group selected from —CO—, —O—, —CH$_2$— and a group or a combination of these. More preferably, $L^3$ has a structure represented by —C(=O)—O—.

The recurring unit represented by the general formula (3) is formed generally through polymerization of a polymerizing compound. The molecular weight of the polymerizing compound of the type is preferably from 50 to 500, more preferably from 70 to 400, even more preferably from 90 to 300.

In general, the polymer (A) can be produced according to a known method using a polymerizable composition containing a polymerizing compound. For example, the composition may be polymerized in a mode of radical polymerization, or may be polymerized in a mode of ionic polymerization or ring-opening polymerization.

The polymerizing compound ingredient contained in the polymerizable composition preferably comprises from 5 to 100% by mass of a polymerizing compound to constitute the recurring unit represented by the general formula (1) and/or the recurring unit represented by the general formula (2), from 0 to 95% by mass of a polymerizing compound to constitute the recurring unit represented by the general formula (3), and at most 5% by mass of any other polymerizing compound. More preferably, the polymerizing compound to constitute the recurring unit represented by the general formula (1) and/or the polymerizing compound to constitute the recurring unit represented by the general formula (2) accounts for from 5 to 95% by mass, even more preferably from 30 to 90% by mass, still more preferably from 40 to 80% by mass. On the other hand, the polymerizing compound capable of forming the recurring unit represented by the general formula (3) in the polymerizing compound contained in the polymerizable composition accounts for preferably from 5 to 95% by mass, more preferably from 10 to 70% by mass, even more preferably from 20 to 60% by mass.

One alone or two or more different types of recurring units represented by the general formula (1), the general formula (2) and the general formula (3) may be used here either singly or as combined.

Specific examples of the polymerizing compound capable of forming the recurring unit represented by the general formula (1) through polymerization are shown as the following A1-1 to A1-24; specific examples of the polymerizing compound capable of forming the recurring unit represented by the general formula (2) are as the following A2-1 to A2-20; and specific examples of the polymerizing compound capable of forming the recurring unit represented by the general formula (3) are as the following A3-1 to A3-5. However, the monomers employable in the invention are not limited to these specific examples.

A1-1

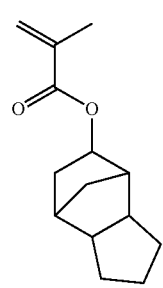

-continued

A1-2

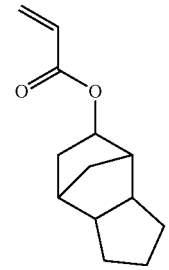

A1-3

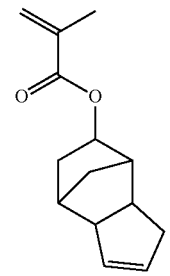

A1-4

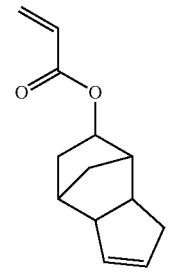

A1-5

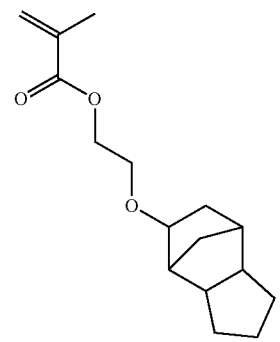

A1-6

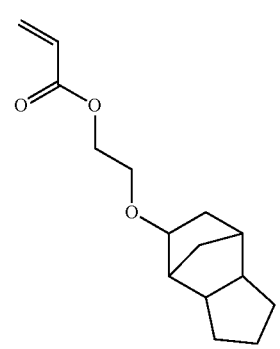

A1-7
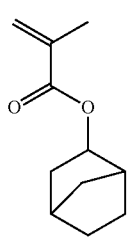
A1-8
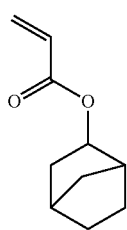
A1-9
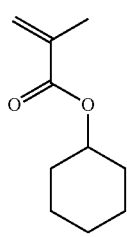
A1-10
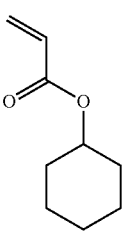
A1-11
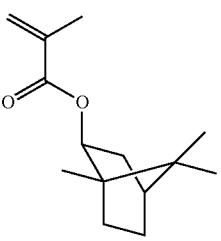
A1-12
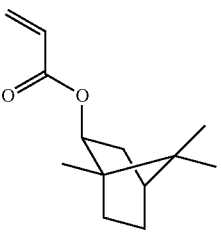
A1-13
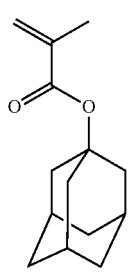
A1-14
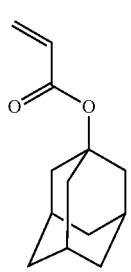
A1-15
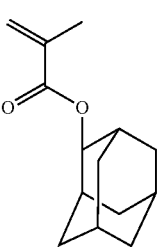
A1-16
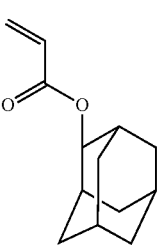
A1-17
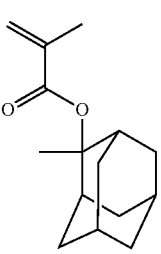
A1-18
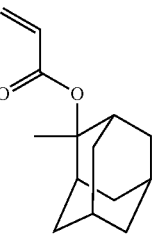

A1-19 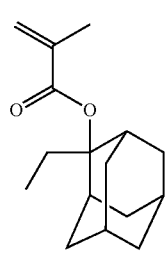
A1-20 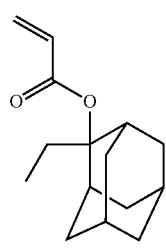
A1-21 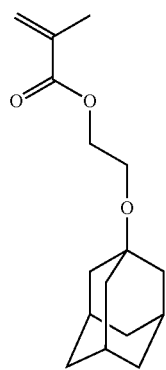
A1-22 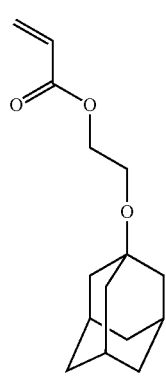
A1-23 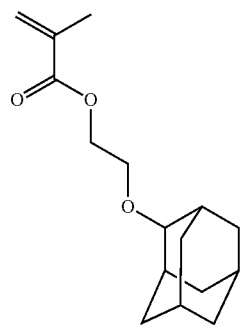
A1-24 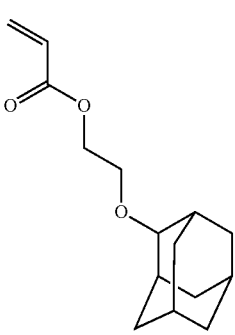
A2-1 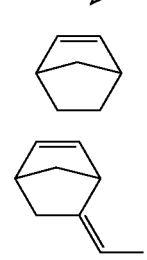
A2-2 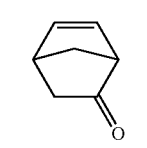
A2-3 
A2-4 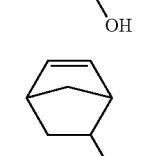
A2-5 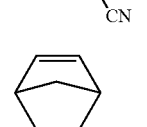
A2-6 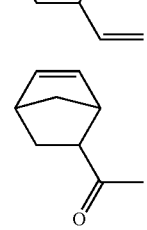
A2-7 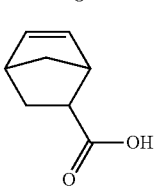
A2-8 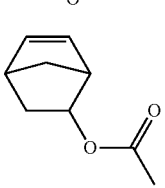
A2-9

A2-10 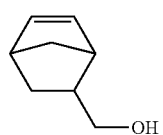
A2-11 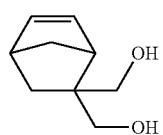
A2-12 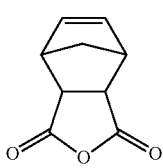
A2-13 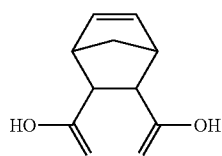
A2-14 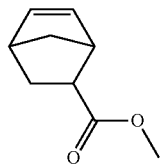
A2-15 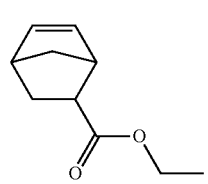
A2-16 
A2-17 
A2-18 
A2-19 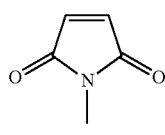
A2-20 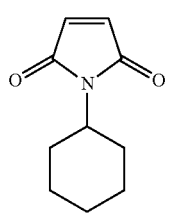
A3-1 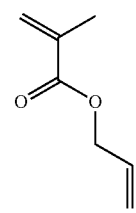
A3-2 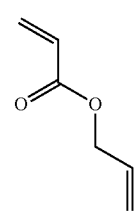
A3-3 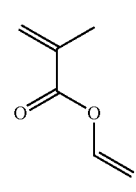
A3-4 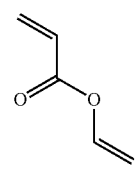
A3-5 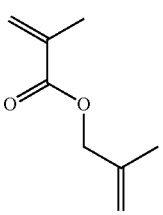

A3-6 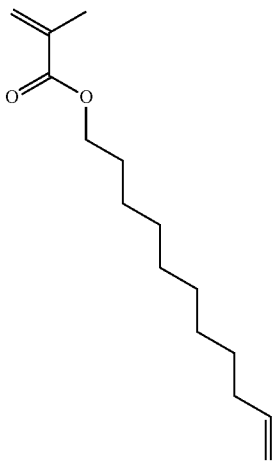

A3-7 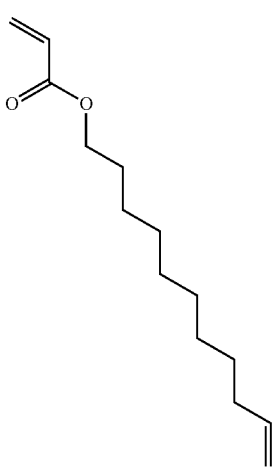

A3-8 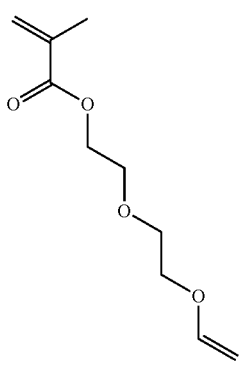

A3-9 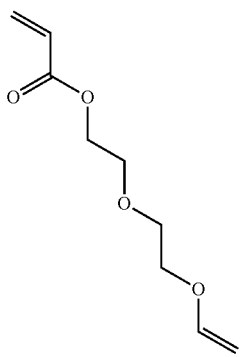

A3-10 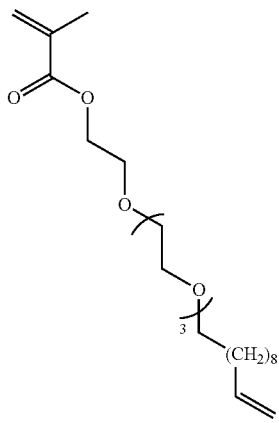

<Copolymerizable Monomer>

The polymer (A) for use in the invention may also be produced through copolymerization of the monomer capable of forming the recurring unit represented by the general formula (1) through polymerization or the recurring unit represented by the general formula (2) or the recurring unit represented by the general formula (3), with any other monomer. As the other monomer, usable are those described in Polymer Handbook 2nd ed., J. Brandrup, Wiley Interscience (1975) Chapter 2, pp. 1-483, etc.

Concretely, for example, there are mentioned compound having one addition-polymerizing unsaturated bond selected from styrene derivatives, 1-vinylnaphthalene, 2-vinylnaphthalene, vinyl carbazole, acrylic acid, methacrylic acid, acrylates, methacrylates, acrylamides, methacrylamides, dialkyl itaconates, dialkyl esters or monoalkyl esters of fumarate, etc.

The styrene derivatives include styrene, 2,4,6-tribromostyrene, 2-phenylstyrene, 4-chlorostyrene, etc.

The acrylates includes methyl acrylate, ethyl acrylate, propyl acrylate, n-butyl acrylate, tert-butyl acrylate, chloroethyl acrylate, 2-hydroxyethyl acrylate, trimethylolpropane monoacrylate, benzyl acrylate, methoxybenzyl acrylate, furfuryl acrylate, tetrahydrofurfuryl acrylate, etc.

The methacrylates include methyl methacrylate, ethyl methacrylate, propyl methacrylate, butyl methacrylate, tert-butyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, etc.

The acrylamides include acrylamide, N-alkylacrylamide (in which the alkyl group has from 1 to 3 carbon atoms, for example, a methyl group, an ethyl group, a propyl group), N,N-dialkylacrylamide (in which the alkyl group has from 1 to 6 carbon atoms), N-hydroxyethyl-N-methylacrylamide, N-2-acetamidethyl-N-acetylacrylamide, etc.

The methacrylamides include methacrylamide, N-alkylmethacrylamide (in which the alkyl group has from 1 to 3 carbon atoms, for example, a methyl group, an ethyl group, a propyl group), N,N-dialkylmethacrylamide (in which the alkyl group has from 1 to 6 carbon atoms), N-hydroxyethyl-N-methylmethacrylamide, N-2-acetamidethyl-N-acetylmethacrylamide, etc.

The dialkyl itaconates include dimethyl itaconate, diethyl itaconate, dibutyl itaconate, etc.; and the dialkyl esters or the monoalkyl esters of fumaric acid include dibutyl fumarate, etc.

In addition, there are also mentioned crotonic acid, itaconic acid, acrylonitrile, methacrylonitrile, maleylonitrile, etc.

<Specific Examples of Polymer (A)>

Preferred examples of the polymer (A) usable in the invention are shown in the following Table. Copolymerizing the monomers shown in the Table in the ratio by mass also shown therein gives the polymer (A). However, the polymer (A) usable in the invention is not limited to these specific examples.

TABLE 1

| Appellation | Polymerizing Compound 1 | | Polymerizing Compound 2 | | Number-Average Molecular Weight |
|---|---|---|---|---|---|
| | type | % by mass | type | % by mass | |
| P-1 | A1-1 | 90 | A3-1 | 10 | 24,000 |
| P-2 | A1-1 | 80 | A3-1 | 20 | 23,000 |
| P-3 | A1-1 | 70 | A3-1 | 30 | 26,000 |
| P-4 | A1-1 | 60 | A3-1 | 40 | 27,000 |
| P-5 | A1-1 | 40 | A3-1 | 60 | 30,000 |
| P-6 | A1-1 | 20 | A3-1 | 80 | 31,000 |
| P-7 | A3-1 | 100 | — | — | 34,000 |
| P-8 | A1-1 | 70 | A3-1 | 30 | 55,000 |
| P-9 | A1-1 | 70 | A3-1 | 30 | 12,000 |
| P-10 | A1-1 | 70 | A3-1 | 30 | 7,000 |
| P-11 | A1-1 | 70 | A3-1 | 30 | 2,000 |
| P-12 | A1-2 | 70 | A3-1 | 30 | 24,000 |
| P-13 | A1-2 | 60 | A3-1 | 40 | 22,000 |
| P-14 | A1-2 | 50 | A3-1 | 50 | 23,000 |
| P-15 | A1-6 | 70 | A3-1 | 30 | 27,000 |
| P-16 | A1-9 | 70 | A3-1 | 30 | 25,000 |
| P-17 | A1-9 | 50 | A3-1 | 50 | 13,000 |
| P-18 | A1-11 | 70 | A3-1 | 30 | 28,000 |
| P-19 | A1-11 | 50 | A3-1 | 50 | 25,000 |
| P-20 | A1-13 | 70 | A3-1 | 30 | 22,000 |
| P-21 | A1-13 | 60 | A3-1 | 40 | 25,000 |
| P-22 | A1-13 | 50 | A3-1 | 50 | 25,000 |
| P-23 | A1-13 | 70 | A3-1 | 30 | 14,000 |
| P-24 | A1-13 | 70 | A3-1 | 30 | 8,000 |
| P-25 | A2-1 | 50 | A3-1 | 50 | 20,000 |
| P-26 | A2-1 | 30 | A3-1 | 70 | 19,000 |
| P-27 | A2-1 | 10 | A3-1 | 90 | 21,000 |
| P-28 | A2-1 | 30 | A3-1 | 70 | 35,000 |
| P-29 | A2-1 | 30 | A3-1 | 70 | 9,000 |
| P-30 | A2-1 | 30 | A3-1 | 70 | 4,000 |
| P-31 | A2-6 | 30 | A3-1 | 70 | 13,000 |
| P-32 | A2-6 | 10 | A3-1 | 90 | 17,000 |
| P-33 | A2-6 | 100 | — | — | 2,000 |
| P-34 | A2-16 | 60 | A3-1 | 40 | 8,000 |
| P-35 | A2-16 | 30 | A3-1 | 70 | 9,000 |
| P-36 | methyl methacrylate | 70 | A3-1 | 30 | 22,000 |
| P-37 | methyl methacrylate | 60 | A3-1 | 40 | 26,000 |
| P-38 | methyl methacrylate | 70 | A3-1 | 30 | 8,000 |

One alone or two or more different types of these polymers (A) may be used in the curable resin composition, either singly or as combined therein.

The number-average molecular weight of the polymer (A) is preferably from 500 to less than 1,000,000, more preferably from 1,000 to 100,000, even more preferably from 3,000 to 70,000.

Preferably, the polymer (A) is contained in the curable resin composition of the invention in an amount falling within a range of from 5 to 60% by mass, more preferably within a range of from 7 to 50% by mass, even more preferably within a range of from 10 to 40% by mass.

[Compound (B) Having at Least Two Polymerizing Unsaturated Groups]

The polymerizing unsaturated bond in the compound (B) having at least two polymerizing unsaturated groups for use in the invention is preferably an acryloyl group, a methacryloyl group, a vinyl group or an allyl group, more preferably an acryloyl group, a methacryloyl group or a vinyl group, even more preferably an acryloyl group or a vinyl group.

Preferably, the compound (B) having at least two polymerizing unsaturated groups for use in the invention has an alicyclic structure having from 5 to 20 carbon atoms, more preferably an alicyclic structure having from 6 to 16 carbon atoms, even more preferably an alicyclic structure having from 6 to 10 carbon atoms. Still more preferably, the compound has a polycyclic alicyclic structure.

Preferably in the compound, the polymerizing unsaturated group and the alicyclic structure bond to each other directly or via a linking group, more preferably via a divalent linking group selected from a group of —CO—, —O—, —CH$_2$— and a combination of these, even more preferably via a divalent linking group selected from a group of —O—, —CH$_2$— and a combination of these.

In the compound (B) having at least two polymerizing unsaturated groups, the number of the polymerizing unsaturated groups is preferably 2 or 3.

The molecular weight of the compound (B) having at least two polymerizing unsaturated groups is preferably from 100 to 700, more preferably from 130 to 600, even more preferably from 150 to 400.

Specific examples of the compound (B) having at least two polymerizing unsaturated groups for use in the invention are shown as the following B-1 to B-20; however, it is needless to say that the invention is not limited to these.

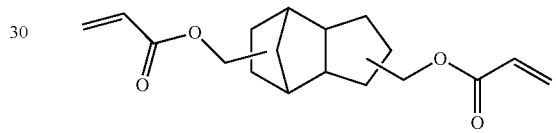

B-1

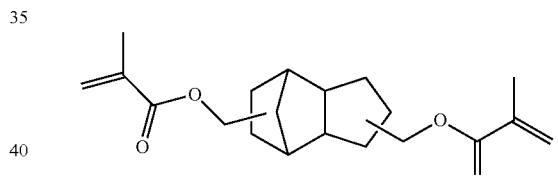

B-2

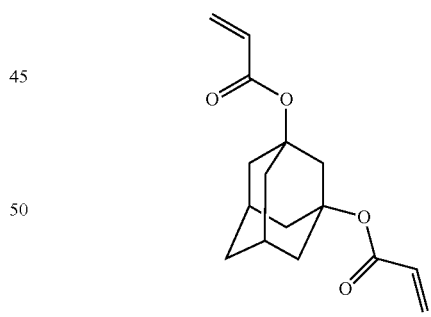

B-3

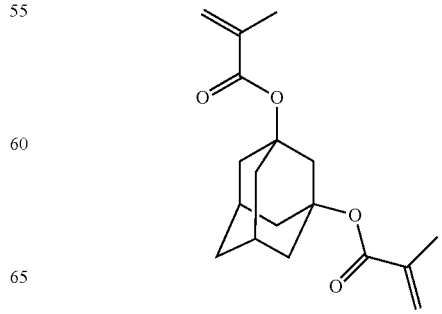

B-4

-continued
B-5
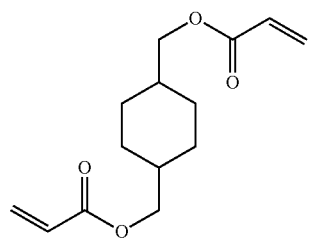
B-6
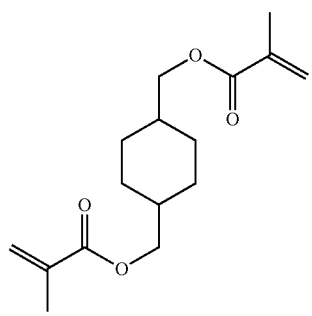
B-7
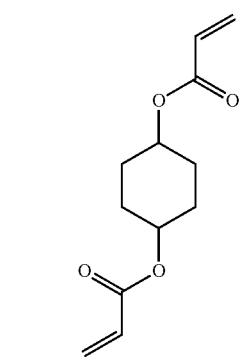
B-8
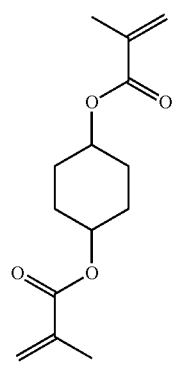
B-9
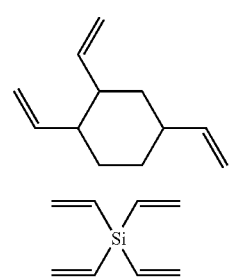
B-10
-continued
B-11
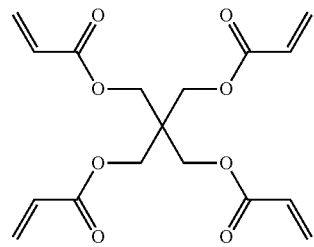
B-12
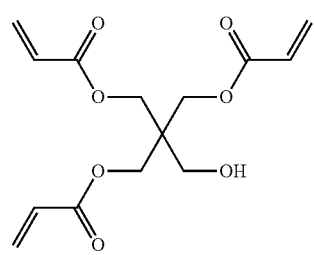
B-13
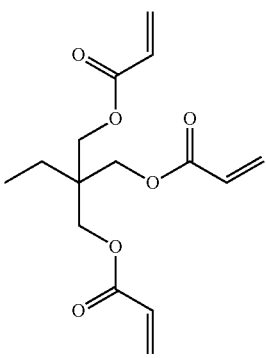
B-14
B-15

B-16
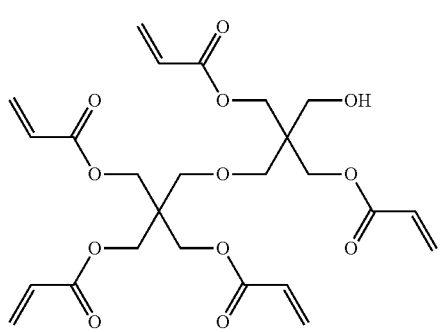

B-17
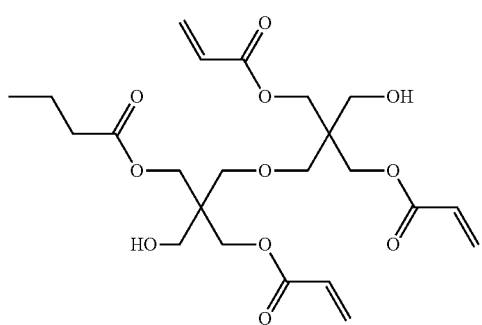

B-18
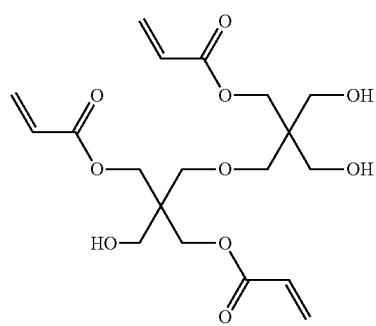

B-19
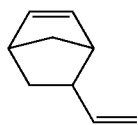

B-20
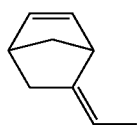

One alone or two or more different types of these compounds (B) having at least two polymerizing unsaturated groups may be used in the curable resin composition, either alone or as combined therein.

Preferably, the compound (B) having at least two polymerizing unsaturated groups is contained in the curable resin composition of the invention in an amount falling within a range of from 20 to 90% by mass, more preferably within a range of from 25 to 80% by mass, even more preferably within a range of from 30 to 70% by mass.

[Compound (C) Having One Polymerizing Unsaturated Group]

The polymerizing unsaturated bond in the compound (C) having one polymerizing unsaturated group for use in the invention is preferably an acryloyl group, a methacryloyl group, a vinyl group or an allyl group, more preferably an acryloyl group, a methacryloyl group or a vinyl group, even more preferably an acryloyl group or a vinyl group.

Preferably, the compound (C) having one polymerizing unsaturated group for use in the invention has an alicyclic structure having from 5 to 20 carbon atoms, more preferably an alicyclic structure having from 6 to 16 carbon atoms, even more preferably an alicyclic structure having from 6 to 10 carbon atoms. Still more preferably, the compound has a polycyclic alicyclic structure.

Preferably in the compound, the polymerizing unsaturated group and the alicyclic structure bond to each other directly or via a linking group, more preferably via a divalent linking group selected from a group of —CO—, —O—, —CH$_2$— and a combination of these, even more preferably via a divalent linking group selected from a group of —O—, —CH$_2$— and a combination of these.

The molecular weight of the compound (C) having one polymerizing unsaturated group is preferably from 100 to 700, more preferably from 150 to 600, even more preferably from 200 to 500.

Specific examples of the compound (C) having one polymerizing unsaturated group for use in the invention are shown as the following C-1 to C-42; however, it is needless to say that the invention is not limited to these.

C-1
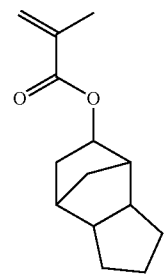

C-2
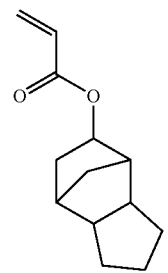

C-3
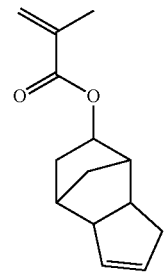

C-4
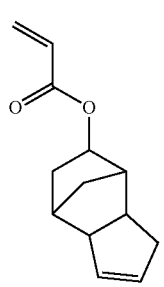
C-5
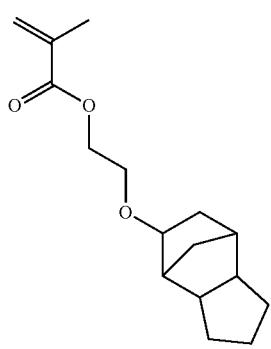
C-6
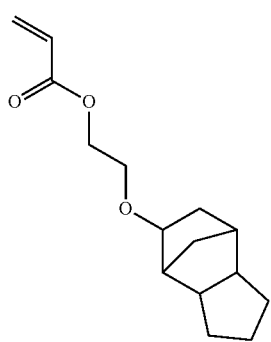
C-7
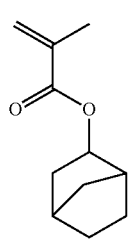
C-8
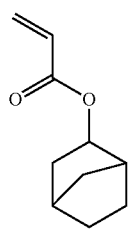
C-9
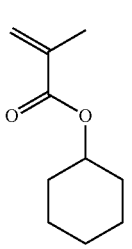
C-10
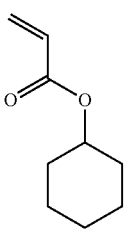
C-11
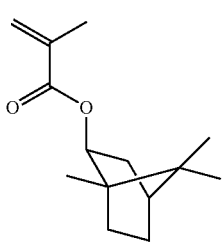
C-12
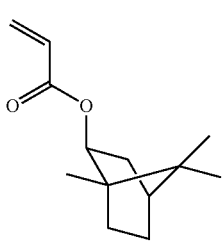
C-13
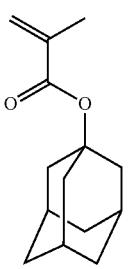
C-14
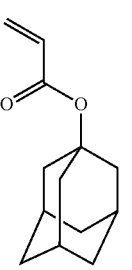

-continued
C-15
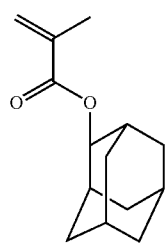
C-16
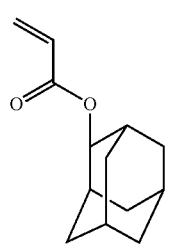
C-17
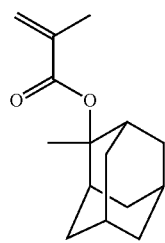
C-18
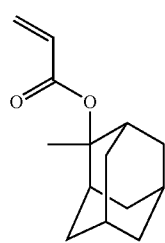
C-19
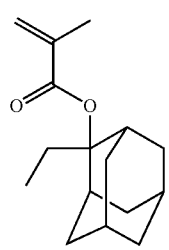
C-20
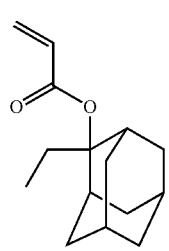
-continued
C-21
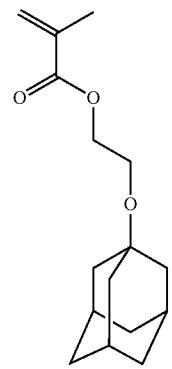
C-22
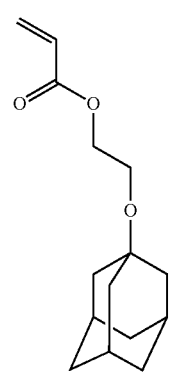
C-23
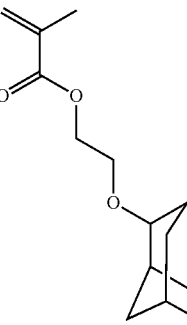
C-24
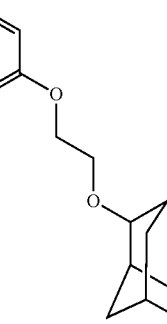
C-25
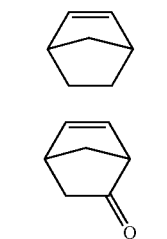
C-26
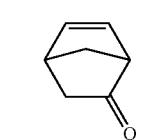

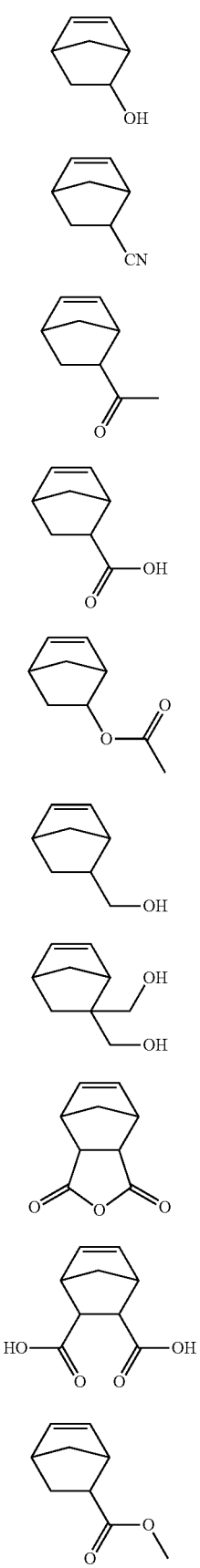
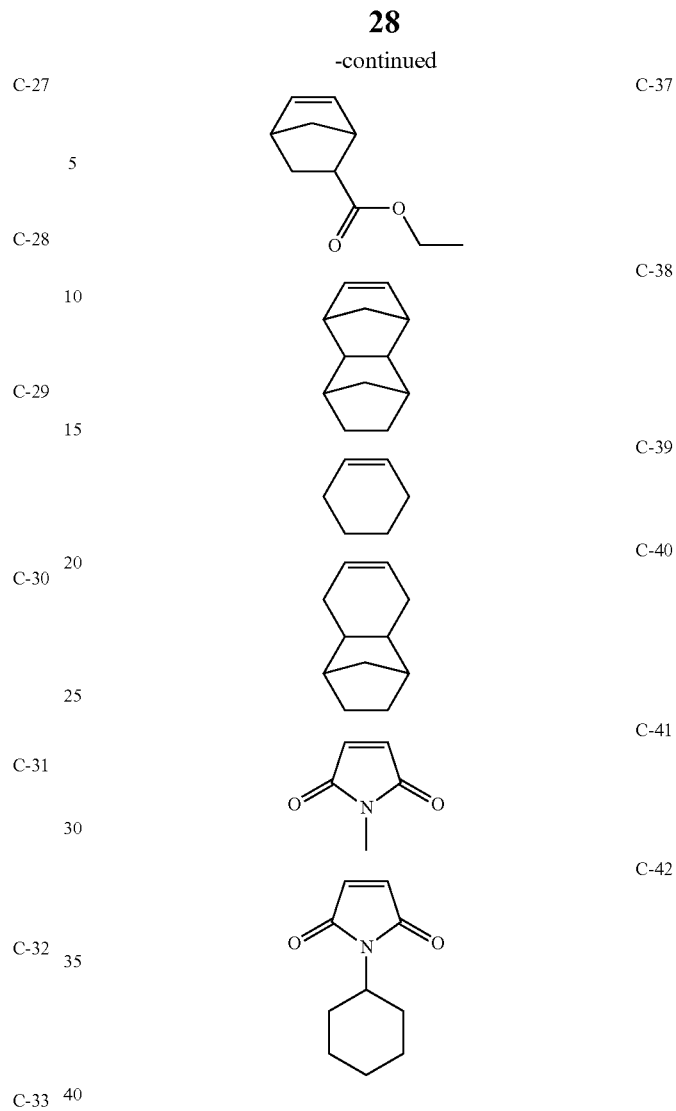

One alone or two or more different types of the compounds (C) having one polymerizing unsaturated group may be used in the curable resin composition either singly or as combined therein.

Preferably, the compound (C) having one polymerizing unsaturated group is contained in the curable resin composition of the invention in an amount falling within a range of from 0 to 40% by mass, more preferably within a range of from 2 to 40% by mass, even more preferably within a range of from 5 to 35% by mass.

[Initiator (D)]

The curable resin composition of the invention may be cured through irradiation with active energy rays such as UV rays, electron beams or the like, or may be cured by heating. More preferably, the composition is cured through both photoirradiation and thermal irradiation.

In case where the composition is cured through irradiation with active energy rays such as UV rays, electron beams or the like, preferably, a photopolymerization initiator is added to the composition. As the photopolymerization initiator, usable is any known one. For example, there are mentioned α-hydroxyalkylphenones, α-aminoalkylphenones, oxime esters, acylphosphine oxides, etc.

In case where the composition is cured by heating, preferably, a thermal polymerization initiator is added thereto. As the thermal polymerization initiator, usable is any known one.

For example, there are mentioned azo compounds such as AIBN, etc., and hydroperoxides, dialkyl peroxides, peroxyesters, diacyl peroxides, peroxy dicarbonates, peroxy ketals, ketone peroxides.

In the invention, preferably, both a photopolymerization initiator and a thermal polymerization initiator are used as combined. More preferably, the two are added to the composition, then the composition is irradiated with active energy rays and then heated. When the method is employed, the composition can be previously semi-cured through irradiation with active energy rays, and accordingly, the curing shrinkage thereof in a forming die (preferably in a mold) can be reduced therefore bringing about advantages in that the form transferability in the forming die is excellent and the composition can be prevented from being leaked through the clearance of the forming die.

The content of the initiator in the curable resin composition of the invention is preferably from 0.001 to 5% by mass, more preferably from 0.1 to 3% by mass.

Any other component than the above can be added to the curable resin composition of the invention, not overstepping the scope and the spirit of the invention. For example, an antioxidant, a light stabilizer and the like are usable. As specific examples of antioxidant and light stabilizer, mentioned are those described in JP-A 2006-231851, paragraphs [0022] to [0025]. Preferably, the amount of these components is at most 5% by mass of the curable resin composition of the invention.

Preferably, the curable resin composition of the invention does not substantially contain a solvent. Not substantially containing means, for example, that the solvent content is at most 1% by mass of the curable resin composition.

Before cured, the curable resin composition of the invention can be liquid at 25° C.

Before cured, the curable resin composition of the invention can have a viscosity of from 10 to 1,000,000 mPa·s, preferably from 50 to 500,000 mPa·s, more preferably from 100 to 100,000 mPa·s.

The curable resin composition of the invention can have a glass transition temperature (Tg) of not lower than 230° C., preferably not lower than 250° C., more preferably not lower than 270° C. The upper limit of the temperature is not specifically defined, but may be generally not higher than 400° C.

After cured, the curable resin composition of the invention can have a light transmittance at a wavelength of 589 nm of at least 75%, preferably at least 80%, more preferably at least 85%.

After cured, the curable resin composition of the invention can have a refractive index at a wavelength of 589 nm of at least 1.45, preferably at least 1.50. The upper limit of the refractive index is not specifically defined, but may be generally at most 1.65.

After cured, the curable resin composition of the invention can have an Abbe's number of at least 45, preferably at least 50. The upper limit of the Abbe's number is not specifically defined, but may be generally at most 70.

[Production Method for Molded Article]

As the method for producing the molded article such as an optical part or the like using the curable resin composition of the invention, any known method is widely employable. For example, the curable resin composition of the invention may be filled in a mold and cured through irradiation with active energy and/or heating to produce the molded article. Especially in the invention, it is desirable that both irradiation with active energy and heating are combined. When the method is employed, the curing shrinkage in a forming die (preferably in a mold) can be reduced therefore bringing about advantages in that the form transferability in the forming die is excellent and the composition can be prevented from being leaked through the clearance of the forming die.

[Optical Parts]

The cured product of the invention is preferably a molded article having high refractivity, light permeability and lightweightness and excellent in optical characteristics, and the optical part of the invention comprises the cured product of the invention. The type of the optical part of the invention is not specifically defined. In particular, the invention is favorably used for optical parts that utilize the excellent optical characteristics of the curable resin composition, especially for light-permeable optical parts (so-called passive optical parts). As the optically-functional apparatus equipped with such optical parts, for example, there are mentioned various types of display devices (liquid-crystal displays, plasma displays, etc.), various types of projector devices (OHP, liquid-crystal projectors, etc.), optical fiber communication devices (optical waveguides, optical amplifiers, etc.), image-taking devices such as cameras, videos, etc.

As the passive optical parts for use in optically-functional devices, for example, there are mentioned lenses, prisms, prism sheets, panels (tabular molded articles), films, optical waveguides (filmy, fibrous or the like ones), optical discs, LED sealants, etc. The passive optical parts may have a multilayer configuration, optionally as provided with any coating layer, for example, a protective layer for preventing the coated face from being mechanically damaged by friction or abrasion, a light-absorbent layer capable of absorbing the light with undesirable wavelengths to cause degradation, such as inorganic particles, substrate and the like, a penetration blocking layer capable of retarding or preventing penetration of reactive low-molecular substances such as moisture, oxygen gas and the like, as well as an antiglare layer, an antireflection layer, a low refractivity layer and the like, and also any other additional functional layer given thereto. Specific examples of the optional coating layer include a transparent conductive film and a gas barrier film of an inorganic oxide coating layer, and a gas barrier film, a hard coat and the like of an organic coating layer. For the coating method, there can be employed any known coating methods such as a vacuum evaporation method, a CVD method, a sputtering method, a dip coating method, a spin coating method, etc.

The optical part using the cured product of the invention is especially favorable for lens substrate. The lens substrate produced according to the production method for the cured product of the invention preferably has a high Abbe's number and additionally has high refractivity, light permeability and lightweightness, and is excellent in optical characteristics. In addition, by suitably changing the type of the monomer to constitute the curable resin composition, the refractive index of the lens substrate can be controlled in any desired manner.

In this description, the "lens substrate" means a single part capable of exhibiting a lens function by itself. On the surface or around the edge of the lens substrate, a film or a member may be arranged depending on the usage environment and the application of the lens. For example, on the surface of the lens substrate, a protective film, an antireflection film, a hard coat film or the like may be formed. The periphery of the lens substrate may be intruded in a substrate holding frame to thereby fix the substrate therein. However, the film and the frame are additional members to be added to the lens substrate, and are therefore differentiated from the lens substrate referred to in this description.

In case where the lens substrate is used as a lens, the lens substrate alone may be used as a lens by itself, or as mentioned above, a film or a frame may be added thereto for using it as a lens as a whole. The type and the shape of the lens using the lens substrate are not specifically defined. The lens substrate can be used, for example, for lenses for eyewear, lenses for optical instruments, lenses for optoelectronics, laser lenses for laser, pickup lenses, lenses for car-mounted cameras, lenses for portable cameras, lenses for digital cameras, lenses for OHP, microlens arrays, wafer-level lens arrays (Japanese Patent 3926380, WO2008/102648, Japanese Patent 4226061, 4226067), etc.

EXAMPLES

The invention is described more concretely with reference to the following Examples. In the following Examples, the material used, its amount and ratio, the details of the treatment and the treatment process may be suitably modified or changed not overstepping the spirit and the scope of the invention. Accordingly, the invention should not be limited to the specific examples shown below.

[Analysis and Evaluation Methods]
(1) Light Transmittance Measurement

A cured product was molded in the form of a substrate having a thickness of 1 mm, and analyzed for the light transmittance at a wavelength of 589 nm thereof, using a UV-visible absorption spectrometer, UV-3100 (by Shimadzu).

(2) Refractive Index Measurement

Using an Abbe's refractiometer (Atago's DR-M4), the sample was analyzed at a wavelength of 589 nm.

(3) Abbe's Number (vD) Measurement

Using an Abbe's refractiometer (Atago's DR-M4), the sample was analyzed for the refractive index at a wavelength of 486 nm, 589 nm and 656 nm thereof. The refractive index at a wavelength of 486 nm was referred to as $n_F$, the refractive index at a wavelength of 589 nm was as $n_D$, and the refractive index at a wavelength of 656 nm was as $n_C$; and the abbe's number of the sample was computed according to the following formula:

$$v_D = \frac{(n_D - 1)}{(n_F - n_C)}$$

(4) Water Absorption Measurement

A cured product was molded in the form of a substrate having a thickness of 1 mm, and its weight ($W_i$) was measured. This was stored in an environmental tester set at 85° C. and 85% RH for one week, and the weight ($W_f$) of the cured product was measured. The water absorption of the sample was computed according to the following formula.

$$\text{Water Absorption (\%)} = \frac{W_f - W_i}{W_i} \times 100$$

(5) Glass Transition Temperature Measurement

Using Rheogel-E4000 (UBM's dynamic viscoelasticity measuring apparatus), a shaped product that had been molded in the form of a rectangular film having a width of 5 mm and a length of 23 mm and having a thickness of 200 μm was tested under a tensile mode at a frequency of 10 Hz and at a strain of 10 μm (constant), and its tan δ within a temperature range of from 30 to 300° C. was measured. The peak temperature in the curve is the glass transition temperature (Tg) of the sample. In case where the sample did not give any definite peak in the range up to 300° C., the glass transition temperature thereof was expressed as >300° C.

(6) Moldability Evaluation

In a process of curing the curable resin composition in a mold to give a molded article, the degree of leakage through the clearance of the mold was measured and the moldability of the composition was evaluated according to the following standards. After molded 10 times, in case where the number of the molded samples with clearance leakage was 0, the samples are excellent (rank A); in case where the number thereof was from 1 to 3, the samples are good (rank B); in case where the number thereof was from 4 to 8, the samples are average (rank C); and in case where the number thereof was 8 or more, the samples are not good (rank D).

[Preparation of Materials]
(1) Synthesis Example for Polymer (A)

45.0 g of tricyclo[5,2,1,0$^{2,6}$]-deca-8-yl methacrylate (Hitachi Chemical Industry's trade name FA-513M, corresponding to the exemplary compound A1-1), 5.0 g of allyl methacrylate (by Wako Pure Chemicals, corresponding to the exemplary compound A3-1) and 500.0 g of ethyl acetate were put into a one-liter three-neck flask equipped with a reflux condenser and a gas-inlet port cock, then purged two times with nitrogen, and thereafter 0.6 g of Wako Pure Chemicals' V-65 (trade name) as an initiator was added thereto, then further purged two times with nitrogen, and thereafter heated in a nitrogen steam at 65° C. for 6 hours. Subsequently, 2 L of methanol was added to the reaction liquid, and the precipitated white solid was collected through suction filtration. This was dried under reduced pressure at 70° C. for 5 hours and the solvent was evaporated away to give a polymer P-1 (yield 60%, number-average molecular weight 24,000, weight-average molecular weight 58,000).

The other exemplified polymers can be prepared in the same manner as above.

(2) Preparation of Curable Resin Composition

The polymer (A) shown in Table 1 was mixed and dissolved in various ingredients in the ratio shown in Table 2 to prepare a curable resin composition. In the following Table, 1-hydroxycyclohexylphenone (by Wako Pure Chemicals) is referred to as D-1; cumeme hydroperoxide (NOF's trade name, PERCUMYL H) is as D-2; and t-butyl peroxy-2-ethylhexanoate (NOF's trade name, PERBUTYL O) is as D-3. In Example 26, 1,6-hexanediol diacrylate (Osaka Organic Chemical Industry's trade name, Biscoat 230; expressed as V 230 in the Table) was used as the monomer (B). In Comparative Example 1 and Comparative Example 2, the polymer (A) was not used. In Comparative Example 3, a polymer Q-1 (the exemplary compound A1-1 was used 100% by weight as the constituent monomer, and the number-average molecular weight of the polymer was 25,000) was used. In Comparative Example 4, a polymer Q-2 (A2-14 was used 100% by weight as the constituent monomer, and the number-average molecular weight of the polymer was 19,000) was used. In Comparative Example 5, an urethane acrylate having a nitrogen atom in the main chain, M-1200 (To a Gosei's trade name, Aronix M-1200) was used. In Comparative Example 6, a curable resin composition comprising methyl methacrylate (MMA) and the exemplary compound B-15 was used. In Comparative Example 6, the polymer (A) did not contain an alicyclic structure.

TABLE 2

| | Polymer (A) | | Monomer (B) | | | | | | Monomer (C) | | Initiator (D) | | | |
|---|---|---|---|---|---|---|---|---|---|---|---|---|---|---|
| | compound | wt. % | compound | wt. % | compound | wt. % | compound | wt. % | compound | wt. % | compound | wt. % | compound | wt. % |
| Example 1 | P-1 | 24.9 | B-1 | 54.5 | B-9 | 4.6 | B-15 | 1.8 | C-13 | 13.6 | D-1 | 0.1 | D-2 | 0.5 |
| Example 2 | P-2 | 24.9 | B-1 | 54.5 | B-9 | 4.6 | B-15 | 1.8 | C-13 | 13.6 | D-1 | 0.1 | D-2 | 0.5 |
| Example 3 | P-3 | 24.9 | B-1 | 54.5 | B-9 | 4.6 | B-15 | 1.8 | C-13 | 13.6 | D-1 | 0.1 | D-2 | 0.5 |
| Example 4 | P-4 | 24.9 | B-1 | 54.5 | B-9 | 4.6 | B-15 | 1.8 | C-13 | 13.6 | D-1 | 0.1 | D-2 | 0.5 |
| Example 5 | P-5 | 24.9 | B-1 | 54.5 | B-9 | 4.6 | B-15 | 1.8 | C-13 | 13.6 | D-1 | 0.1 | D-2 | 0.5 |
| Example 6 | P-6 | 24.9 | B-1 | 54.5 | B-9 | 4.6 | B-15 | 1.8 | C-13 | 13.6 | D-1 | 0.1 | D-2 | 0.5 |
| Example 7 | P-7 | 24.9 | B-1 | 54.5 | B-9 | 4.6 | B-15 | 1.8 | C-13 | 13.6 | D-1 | 0.1 | D-2 | 0.5 |
| Example 8 | P-8 | 12.4 | B-1 | 67.0 | B-9 | 4.6 | B-15 | 1.8 | C-13 | 13.6 | D-1 | 0.1 | D-2 | 0.5 |
| Example 9 | P-9 | 34.9 | B-1 | 44.5 | B-9 | 4.6 | B-15 | 1.8 | C-13 | 13.6 | D-1 | 0.1 | D-2 | 0.5 |
| Example 10 | P-10 | 44.9 | B-1 | 34.5 | B-9 | 4.6 | B-15 | 1.8 | C-13 | 13.6 | D-1 | 0.1 | D-2 | 0.5 |
| Example 11 | P-12 | 24.9 | B-1 | 54.5 | B-9 | 4.6 | B-15 | 1.8 | C-13 | 13.6 | D-1 | 0.1 | D-2 | 0.5 |
| Example 12 | P-15 | 24.9 | B-1 | 54.5 | B-9 | 4.6 | B-15 | 1.8 | C-13 | 13.6 | D-1 | 0.1 | D-2 | 0.5 |
| Example 13 | P-16 | 24.9 | B-1 | 54.5 | B-9 | 4.6 | B-15 | 1.8 | C-13 | 13.6 | D-1 | 0.1 | D-2 | 0.5 |
| Example 14 | P-20 | 24.9 | B-1 | 54.5 | B-9 | 4.6 | B-15 | 1.8 | C-13 | 13.6 | D-1 | 0.1 | D-2 | 0.5 |
| Example 15 | P-26 | 24.9 | B-1 | 54.5 | B-9 | 4.6 | B-15 | 1.8 | C-13 | 13.6 | D-1 | 0.1 | D-2 | 0.5 |
| Example 16 | P-31 | 24.9 | B-1 | 54.5 | B-9 | 4.6 | B-15 | 1.8 | C-13 | 13.6 | D-1 | 0.1 | D-2 | 0.5 |
| Example 17 | P-36 | 24.9 | B-1 | 54.5 | B-9 | 4.6 | B-15 | 1.8 | C-13 | 13.6 | D-1 | 0.1 | D-2 | 0.5 |
| Example 18 | P-3 | 24.9 | B-1 | 54.5 | B-9 | 9.1 | B-15 | 1.8 | C-13 | 9.1 | D-1 | 0.1 | D-2 | 0.5 |
| Example 19 | P-3 | 24.9 | B-1 | 54.5 | B-9 | 13.6 | B-15 | 1.8 | C-13 | 4.6 | D-1 | 0.1 | D-2 | 0.5 |
| Example 20 | P-3 | 24.9 | B-1 | 60.9 | — | — | — | — | C-13 | 13.6 | D-1 | 0.1 | D-2 | 0.5 |
| Example 21 | P-3 | 24.9 | B-1 | 67.7 | — | — | — | — | C-13 | 6.8 | D-1 | 0.1 | D-2 | 0.5 |
| Example 22 | P-3 | 24.9 | B-1 | 74.5 | — | — | — | — | — | — | D-1 | 0.1 | D-2 | 0.5 |
| Example 23 | P-13 | 24.9 | B-2 | 54.5 | B-10 | 4.6 | B-15 | 1.8 | C-13 | 13.6 | D-1 | 0.1 | D-2 | 0.5 |
| Example 24 | P-13 | 24.9 | B-3 | 54.5 | B-9 | 9.1 | B-11 | 1.8 | C-14 | 9.1 | D-1 | 0.1 | D-2 | 0.5 |
| Example 25 | P-13 | 24.9 | B-1 | 54.5 | B-10 | 4.6 | B-15 | 1.8 | C-2 | 13.6 | D-1 | 0.1 | D-2 | 0.5 |
| Example 26 | P-12 | 29.5 | V230 | 44.5 | | | B-15 | 11.8 | C-13 | 13.6 | D-1 | 0.1 | D-2 | 0.5 |
| Example 27 | P-12 | 24.9 | B-1 | 54.5 | B-9 | 4.6 | B-15 | 1.8 | C-13 | 13.6 | D-1 | 0.1 | D-3 | 0.5 |
| Example 28 | P-12 | 24.9 | B-1 | 54.5 | B-9 | 4.6 | B-15 | 1.8 | C-13 | 13.6 | — | — | D-2 | 0.5 |
| Comparative Example 1 | — | — | B-1 | 99.4 | — | — | — | — | — | — | D-1 | 0.1 | D-2 | 0.5 |
| Comparative Example 2 | — | — | B-1 | 99.4 | — | — | — | — | C-13 | — | D-1 | 0.1 | D-2 | 0.5 |
| Comparative Example 3 | Q-1 | 24.9 | B-1 | 54.5 | B-9 | 4.6 | B-15 | 1.8 | C-13 | 13.6 | D-1 | 0.1 | D-2 | 0.5 |
| Comparative Example 4 | Q-2 | 24.9 | B-1 | 54.5 | B-9 | 4.6 | B-15 | 1.8 | C-13 | 13.6 | D-1 | 0.1 | D-2 | 0.5 |
| Comparative Example 5 | M-1200 | 24.9 | B-1 | 54.5 | B-9 | 4.6 | B-15 | 1.8 | C-13 | 13.6 | D-1 | 0.1 | D-2 | 0.5 |
| Comparative Example 6 | — | — | MMA | 90.0 | — | — | B-15 | 10.0 | — | — | D-1 | 0.1 | D-2 | 0.5 |

[Production of Optical Part through UV Irradiation and Thermal Compression]

Using the composition of Examples and Comparative Examples, a lens was produced according to the process mentioned below.

An arbitrary amount of the curable resin composition was put into a mold (material; SUS304), and through the aperture of the mold, this was irradiated with UV light at 30 mW/cm², using HOYA's UL750, and was thus semi-cured, and thereafter this was heated from room temperature up to 200° C. at a rate of 10° C./min and thermally compressed under a pressure of 20 kgf to give a molded article. The obtained cured product was analyzed for light transmittance measurement, refractive index measurement, Abbe's number measurement, water absorption measurement and glass transition temperature measurement. During molding, the moldability of the composition was evaluated. The results are shown in Table 3 below. Subsequently, the molded article for lens was shaped into a lens, thereby giving an optical part, lens.

TABLE 3

| | Evaluation of Optical Part | | | | | |
|---|---|---|---|---|---|---|
| Curable Resin Composition | Light Transmittance (%) | Refractive Index | Abbe's Number | Water Absorption (%) | Glass Transition Temperature (° C.) | Moldability Evaluation |
| Example 1 | 78.2 | 1.525 | 55.1 | 0.80 | 270 | B |
| Example 2 | 83.4 | 1.524 | 55.8 | 0.87 | 285 | A |
| Example 3 | 89.5 | 1.524 | 56.8 | 0.91 | >300 | A |
| Example 4 | 90.6 | 1.523 | 56.2 | 0.92 | >300 | A |
| Example 5 | 90.4 | 1.517 | 55.9 | 0.95 | >300 | A |
| Example 6 | 88.5 | 1.516 | 56.4 | 1.08 | >300 | A |
| Example 7 | 76.4 | 1.510 | 56.2 | 1.18 | >300 | A |
| Example 8 | 88.8 | 1.528 | 56.1 | 1.02 | >300 | A |
| Example 9 | 86.2 | 1.524 | 56.5 | 0.82 | >300 | A |
| Example 10 | 84.3 | 1.521 | 56.3 | 0.75 | >300 | A |
| Example 11 | 90.3 | 1.526 | 56.7 | 0.88 | >300 | A |
| Example 12 | 91.2 | 1.511 | 57.3 | 0.83 | 250 | A |

TABLE 3-continued

| Curable Resin Composition | Light Transmittance (%) | Refractive Index | Abbe's Number | Water Absorption (%) | Glass Transition Temperature (° C.) | Moldability Evaluation |
|---|---|---|---|---|---|---|
| Example 13 | 89.7 | 1.512 | 55.8 | 0.99 | 270 | A |
| Example 14 | 88.5 | 1.528 | 55.2 | 0.93 | >300 | A |
| Example 15 | 91.0 | 1.518 | 55.9 | 0.65 | >300 | A |
| Example 16 | 89.4 | 1.520 | 55.7 | 0.73 | >300 | A |
| Example 17 | 90.3 | 1.498 | 54.3 | 0.83 | 235 | A |
| Example 18 | 89.6 | 1.524 | 56.7 | 0.84 | >300 | A |
| Example 19 | 90.3 | 1.523 | 56.9 | 0.72 | >300 | A |
| Example 20 | 91.2 | 1.527 | 57.1 | 0.94 | >300 | A |
| Example 21 | 91.4 | 1.528 | 56.4 | 1.03 | >300 | A |
| Example 22 | 89.3 | 1.526 | 56.6 | 1.15 | >300 | A |
| Example 23 | 91.3 | 1.518 | 55.9 | 0.90 | >300 | A |
| Example 24 | 88.7 | 1.524 | 56.4 | 0.87 | >300 | A |
| Example 25 | 90.4 | 1.517 | 56.1 | 0.94 | >300 | A |
| Example 26 | 84.2 | 1.507 | 53.2 | 1.24 | 234 | A |
| Example 27 | 90.2 | 1.525 | 56.5 | 0.86 | >300 | A |
| Example 28 | 88.7 | 1.519 | 55.4 | 0.82 | >300 | B |
| Comparative Example 1 | 87.6 | 1.521 | 55.4 | 1.21 | 270 | D |
| Comparative Example 2 | 89.6 | 1.522 | 54.2 | 0.68 | 240 | D |
| Comparative Example 3 | <1 | immeasurable | immeasurable | 0.80 | 140 | C |
| Comparative Example 4 | <1 | immeasurable | immeasurable | 0.67 | 190 | C |
| Comparative Example 5 | 84.1 | 1.504 | 51.2 | 2.94 | 220 | C |
| Comparative Example 6 | 88.2 | 1.482 | 56.2 | 1.62 | 120 | D |

As obvious from Table 3, the curable resin compositions of the invention had good moldability and gave good optical parts having a refractive index of more than 1.45, an Abbe's number of more than 45, good transparency, small water absorption and a high glass transition temperature (Examples 1 to 28). On the other hand, in Comparative Example 1 and Comparative Example 2 not using the polymer (A), the viscosity of the curable resin composition was low, and the moldability thereof was poor. In Comparative Example 3 and Comparative Example 4 using a polymer not having a polymerizing unsaturated bond, the composition underwent phase separation after cured and therefore the transmittance thereof was low, and consequently, the refractive index and the Abbe's number thereof could not be measured, and the glass transition temperature thereof was low. In Comparative Example 5 using an urethane acrylate having a nitrogen atom in the main chain, the water absorption was high.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2011/065427, filed Jul. 6, 2011, Japanese Application No. 2010-170813, filed Jul. 29, 2010, and Japanese Application No. 2011-123260, filed Jun. 1, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A curable resin composition comprising a polymer (A) that has a main chain comprising carbon atoms and a side chain having a polymerizing unsaturated linking group and has a cyclic structure in the main chain and/or the side chain, and a compound having a polymerizing unsaturated group, wherein the polymer (A) has at least one type of recurring unit of the recurring unit represented by the following general formula (1) and the recurring unit represented by the following general formula (2):

General Formula (1)

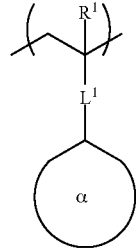

wherein, in the general formula (1), $R^1$ represents a hydrogen atom or a substituent; $L^1$ represents a divalent linking group or a single bond; and the ring α represents a monocyclic or multicyclic ring, General Formula (2)

wherein, in the general formula (2), the ring β represents a monocyclic or polycyclic ring;
and further wherein the recurring unit is selected from the recurring unit represented by the general formula (1) where α contains a cyclic structure having a skeleton with a structure selected from the following group (1), and the recurring unit represented by the general formula (2) where β contains a cyclic structure having a skeleton with a structure selected from the following group (2):

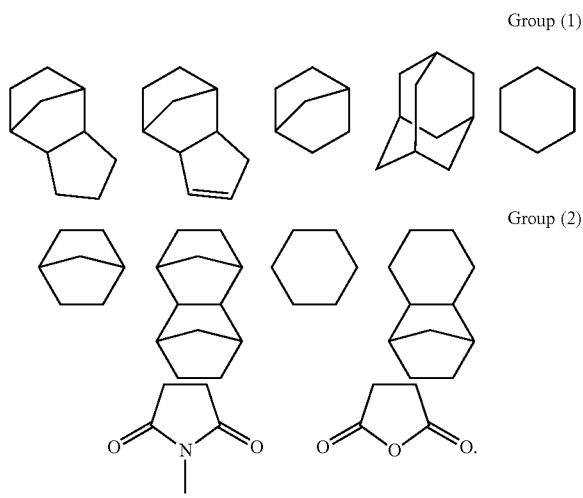

2. The curable resin composition according to claim 1, which contains, as the compound having a polymerizing unsaturated group, a compound (B) having at least two polymerizing unsaturated groups.

3. The curable resin composition according to claim 2, wherein the polymerizing unsaturated groups that the compound (B) having at least two polymerizing unsaturated groups each are selected from an acryloyl group, a methacryloyl group, a vinyl group and an allyl group.

4. The curable resin composition according to claim 2, wherein the compound (B) having at least two polymerizing unsaturated groups has an alicyclic structure.

5. The curable resin composition according to claim 1, which contains, as the compound having a polymerizing unsaturated group, a compound (C) having one polymerizing unsaturated group.

6. The curable resin composition according to claim 5, wherein the compound (C) having one polymerizing unsaturated group has a cyclic structure.

7. The curable resin composition according to claim 1, wherein the cyclic structure having a skeleton with a structure selected from the group (2) is a cyclic structure having a skeleton with from 5 to 10 carbon atoms.

8. The curable resin composition according to claim 1, wherein, in the recurring unit represented by the general formula (1), $L^1$ is selected from a group of —CO—, —O—, —CH$_2$— and a combination of these.

9. The curable resin composition according to claim 1, wherein the polymer (A) further contains a recurring unit represented by the following general formula (3):

General Formula (3)

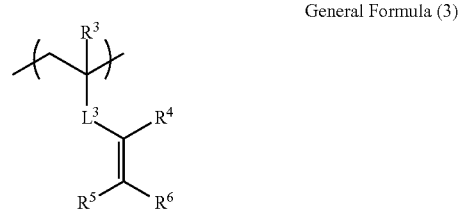

wherein, in the general formula (3), $R^3$ to $R^6$ each independently represents a hydrogen atom or a substituent; and $L^3$ represents a divalent linking group or a single bond.

10. The curable resin composition according to claim 1, wherein the polymer (A) is a polymerizable composition containing a polymerizing compound, and the polymerizing compound ingredient is produced by the use of a polymerizable composition composed of only from 5 to 100% by mass of a polymerizing compound to constitute the recurring unit represented by the general formula (1) and/or the recurring unit represented by the general formula (2), from 0 to 95% by mass of a polymerizing compound to constitute a recurring unit represented by the following general formula (3), General Formula (3)

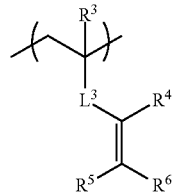

wherein, in the general formula (3), $R^3$ to $R^6$ each independently represents a hydrogen atom or a substituent; and $L^3$ represents a divalent linking group or a single bond, and at most 5% by mass of any other recurring unit.

11. The curable resin composition according to claim 1, wherein the weight-average molecular weight of the polymer (A) is from 500 to less than 1,000,000.

12. The curable resin composition according to claim 5, wherein the content of the polymer (A) is from 5 to 60% by mass, the content of the compound (B) having at least two polymerizing unsaturated groups is from 20 to 90% by mass, the content of the compound (C) having one polymerizing unsaturated group is from 0 to 40% by mass, and the content of ingredients other than the compounds (A), (B) and (C) is at most 5% by mass.

13. The curable resin composition according to claim 1, which contains at least two types of initiators (D) that initiate curing through irradiation with light or heat.

14. The curable resin composition according to claim 1, of which, after being cured, the refractive index at a wavelength of 589 nm is at least 1.45, the Abbe's number is at least 45 and the light transmittance at a wavelength of 589 nm through a thickness thereof of 1 mm is at least 75%.

15. The curable resin composition according to claim 1, of which, after being cured, the glass transition temperature is not lower than 230° C.

16. A molded article produced by molding the curable resin composition according to claim 1.

17. The molded article according to claim 16, which is an optical part.

18. The molded article according to claim 17, which is a lens substrate.

19. A method for producing a molded article, which comprises curing a curable resin composition in two stages of irradiation with active energy rays followed by heating in a mold, wherein the curable resin composition comprises a polymer (A) that has a main chain comprising carbon atoms and a side chain having a polymerizing unsaturated linking group and has a cyclic structure in the main chain and/or the side chain, and a compound having a polymerizing unsaturated group, wherein the curable resin composition comprises at least one photopolymerization initiator and at least one thermal polymerization initiator.

20. The curable resin composition according to claim 1, wherein the recurring unit represented by the general formula (1) is derived from one of the following A1-1 to A1-10 and A1-13 to A1-24:

A1-1

A1-2

A1-3

A1-4

A1-5

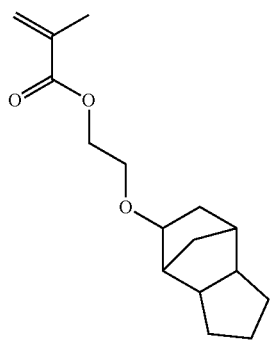

A1-6

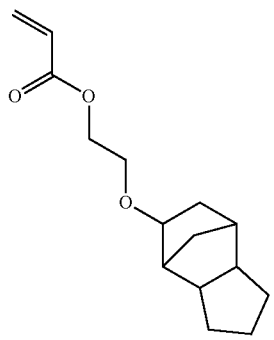

A1-7

A1-8

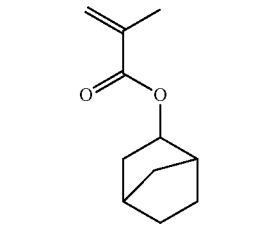

A1-9

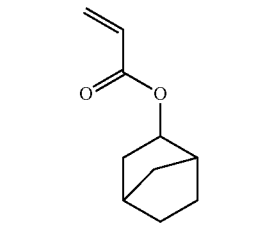

A1-10

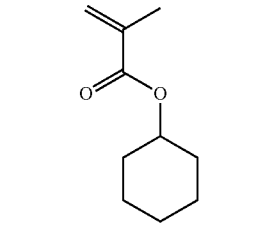

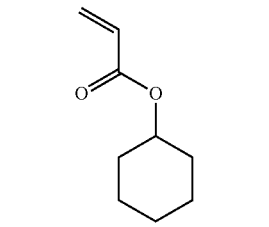

A1-13
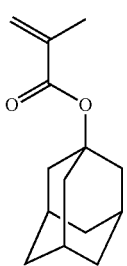
A1-14
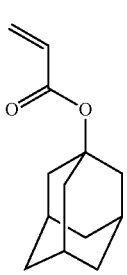
A1-15
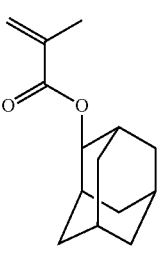
A1-16
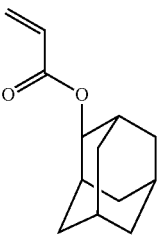
A1-17
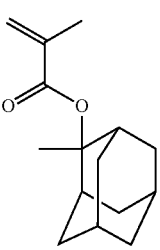
A1-18
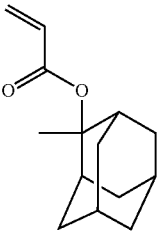
A1-19
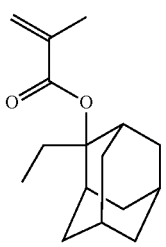
A1-20
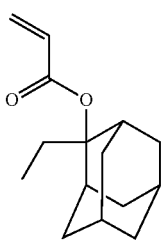
A1-21
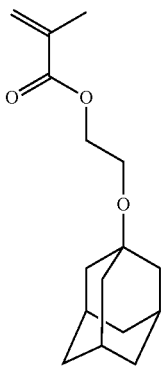
A1-22
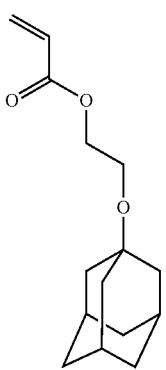
A1-23
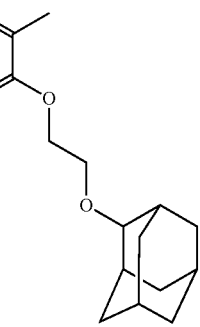

A1-24
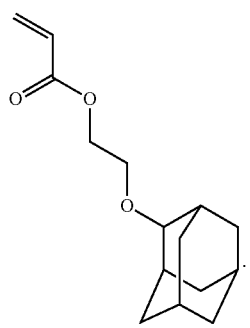
21. The curable resin composition according to claim 9, wherein the recurring unit represented by the general formula (3) is derived from one of the following A3-1 to A3-10:
A3-1
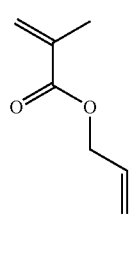
A3-2
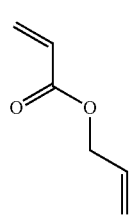
A3-3
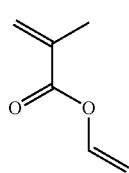
A3-4
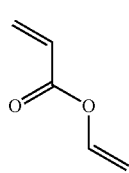
A3-5
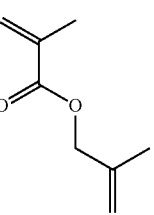
A3-6
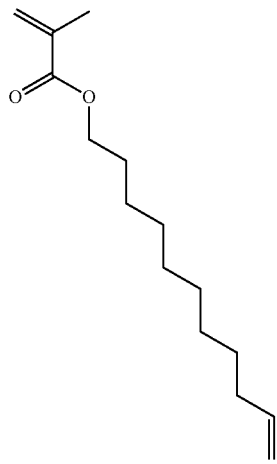
A3-7
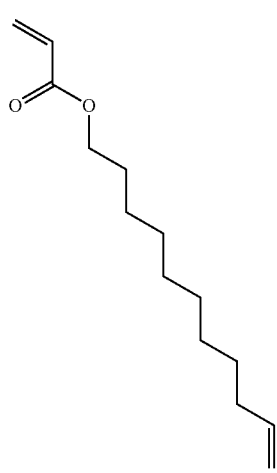
A3-8
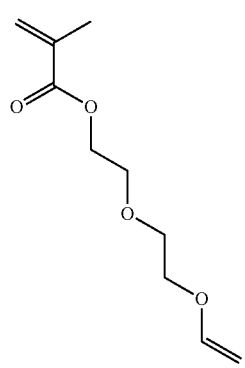
A3-9
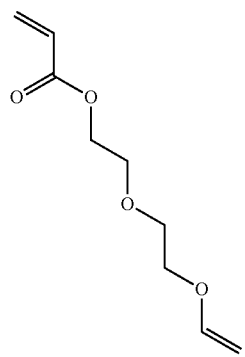

A3-10
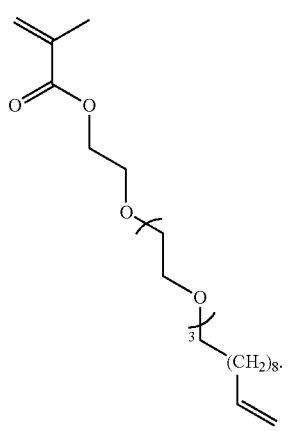
22. The curable resin composition according to claim 2, wherein the compound (B) having at least two polymerizing unsaturated groups is selected from the following B-1 to B-10:
B-1
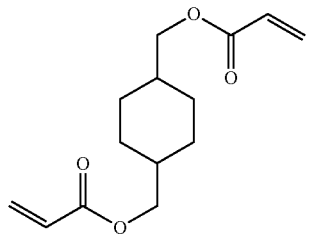
B-2
B-3
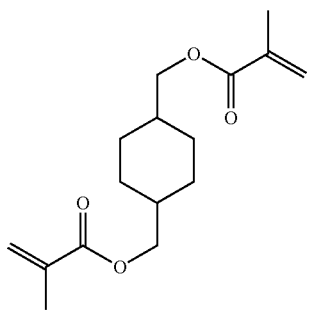
B-4
B-5
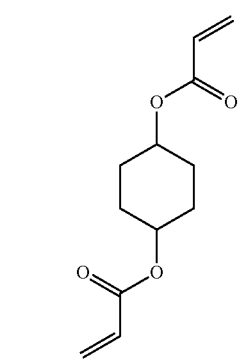
B-6
B-7
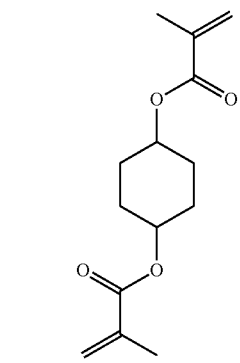
B-8
B-9
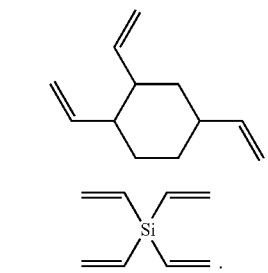
B-10
23. A method for producing a molded article according to claim 19, wherein the polymer (A) in the curable resin composition has at least one type of recurring unit of the recurring unit represented by the following general formula (1) and the recurring unit represented by the following general formula (2):

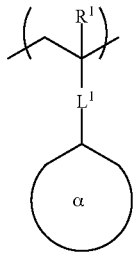

General Formula (1)

wherein, in the general formula (1), R¹ represents a hydrogen atom or a substituent; L¹ represents a divalent linking group or a single bond; and the ring α represents a monocyclic or multicyclic ring,

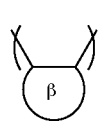

General Formula (2)

wherein, in the general formula (2), the ring β represents a monocyclic or polycyclic ring;
and further wherein the recurring unit is selected from the recurring unit represented by the general formula (1) where α contains a cyclic structure having a skeleton with a structure selected from the following group (1), and the recurring unit represented by the general formula (2) where β contains a cyclic structure having a skeleton with a structure selected from the following group (2):

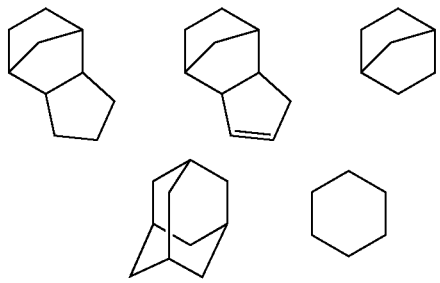

Group (1)

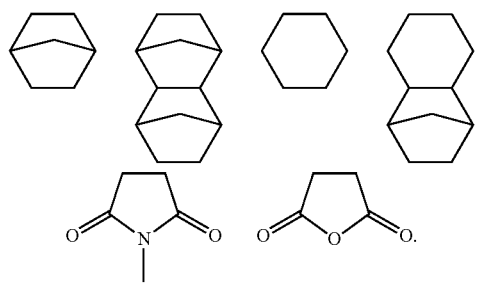

Group (2)

* * * * *